US008534241B2

(12) United States Patent
Gaiser

(10) Patent No.: US 8,534,241 B2
(45) Date of Patent: Sep. 17, 2013

(54) CAM PLATE BEARINGS FOR BARREL ENGINE

(75) Inventor: Randall R. Gaiser, Chelsea, MI (US)

(73) Assignee: Thomas Engine Company, LLC, Boulder, CO (US)

( * ) Notice: Subject to any disclaimer, the term of this patent is extended or adjusted under 35 U.S.C. 154(b) by 360 days.

(21) Appl. No.: 13/088,917

(22) Filed: Apr. 18, 2011

(65) Prior Publication Data
US 2011/0253081 A1 Oct. 20, 2011

Related U.S. Application Data

(60) Provisional application No. 61/325,896, filed on Apr. 20, 2010, provisional application No. 61/171,276, filed on Apr. 21, 2009.

(51) Int. Cl.
F02B 75/18 (2006.01)

(52) U.S. Cl.
USPC .................... 123/56.3; 123/48 R; 123/202

(58) Field of Classification Search
USPC ............ 123/56.3, 48 R, 78 R, 202; 384/276, 384/294, 428, 429
See application file for complete search history.

(56) References Cited

U.S. PATENT DOCUMENTS

| 2,243,817 | A | * | 5/1941 | Herrmann | 123/41.31 |
| 2,983,264 | A | * | 5/1961 | Herrmann | 123/56.8 |
| 5,417,552 | A | * | 5/1995 | Kayukawa et al. | 417/222.2 |
| 7,409,932 | B2 | * | 8/2008 | Gaiser | 123/56.2 |
| 7,600,493 | B2 | * | 10/2009 | Geiser | 123/56.3 |
| 2006/0037567 | A1 | * | 2/2006 | Thomas | 123/56.7 |
| 2007/0193555 | A1 | * | 8/2007 | Polt | 123/241 |
| 2010/0254641 | A1 | * | 10/2010 | Hoppe | 384/125 |
| 2010/0300410 | A1 | * | 12/2010 | Arnold | 123/48 B |

* cited by examiner

Primary Examiner — Noah Kamen
Assistant Examiner — Grant Moubry
(74) Attorney, Agent, or Firm — Gifford, Krass, Sprinkle, Anderson & Citkowski, P.C.; Douglas L. Wathen

(57) ABSTRACT

A barrel engine has a housing with a longitudinal bore with a pair of spaced apart bearing surfaces. An output shaft is disposed in the bore and has an outer surface with engagement elements. A cam plate has a central portion and a cam portion. The central portion has an outer surface with a pair of spaced apart bearing surfaces and a bore with an inner surface with engagement elements. The cam plate is received on the output shaft with the engagement elements on the inner surface of the cam plate bore being mechanically coupled to the engagement elements on the outer surface of the output shaft such that the shaft and cam plate are coupled for rotation and the cam plate is longitudinally slidable with respect to the shaft. The cam plate is disposed such that the bearing surfaces are generally aligned with the bearing surfaces of the bore.

20 Claims, 8 Drawing Sheets

CAM PLATE BEARINGS FOR BARREL ENGINE

CROSS REFERENCE TO RELATED APPLICATION

This utility patent application claims priority from U.S. provisional patent application Ser. No. 61/325,896, filed Apr. 20, 2010, and U.S. provisional patent application Ser. No. 61/171,276, filed Apr. 21, 2009, the entire content of both which are incorporated herein in their entirety.

FIELD OF THE INVENTION

The present invention relates to bearings for supporting a cam plate in a barrel engine and a barrel engine incorporating these bearings.

BACKGROUND OF THE INVENTION

Internal combustion engines are widely used for driving a variety of vehicles. Internal combustion engines come in a variety of configurations, which are typically aptly named for the particular orientation or arrangement of the reciprocating pistons and cylinders in the engines. One example of an internal combustion engine is a "V" type engine, in which the "V" refers to the arrangement of the cylinders in rows that are angled relative to each other to form a V shape. Another type of internal combustion engine that is most relevant to the invention is a barrel-type engine.

Barrel engines typically include a plurality of cylinders and pistons arranged in the form of a "barrel" in which their axes are parallel to each other and arranged along a circle concentric with the power output shaft. Power is transmitted from the reciprocating pistons to a cam plate via a sliding or roller interface. The cam plate's nominal plane is perpendicular to the piston axes and attached to the output shaft. One variation, commonly referred to as a double-ended barrel engine, typically uses a double-ended piston construction and utilizes piston and rod assemblies that have power cylinders at each end. Another configuration of the barrel engine concept, commonly known as a single-ended barrel engine, only uses power cylinders at one end.

SUMMARY OF THE INVENTION

An internal combustion barrel engine in accordance with an embodiment of the present invention has an engine housing with a first end and an opposite second end. A longitudinal bore is in the housing. The bore in the engine housing has an inner surface with a pair of spaced apart bearing surfaces defined thereon. An elongated longitudinal output shaft is disposed in the longitudinal bore of the engine housing and defines a longitudinal axis of the engine. The output shaft has an outer surface with engagement elements defined thereon. A plurality of cylinders is defined in the engine housing and disposed about the longitudinal output shaft. Each of the cylinders has a cylinder axis that is generally parallel to the longitudinal axis of the engine. Each of the cylinders has a closed end adjacent the first end of the housing and an opposite open end. A cam plate is disposed between the open ends of the cylinders and the second end of the engine housing. The cam plate has a central portion and a cam portion extending outwardly therefrom. The cam portion has a non-planar undulating cam surface. The central portion of the cam plate has an outer surface with a pair of spaced apart bearing surfaces defined thereon. The central portion of the cam plate also has a bore defined longitudinally therethrough, the bore having an inner surface with engagement elements defined thereon. The cam plate is received on the output shaft with the output shaft extending through the bore in the cam plate. The engagement elements on the inner surface of the cam plate bore are mechanically coupled to the engagement elements on the outer surface of the output shaft such that the shaft and cam plate are coupled for rotation about the longitudinal axis and the can plate is longitudinally slidable with respect to the shaft. The cam plate is disposed in the bore in the housing such that the bearing surfaces on the outer surface of the central portion of the cam plate are generally aligned with the bearing surfaces on the inner surface of the bore in the housing.

In some versions, the central portion of the cam plate has a base portion extending toward the second end of the engine housing and an opposite top portion extending toward the first end of the engine. One of the pair of bearing surfaces is defined on the outer surface of the top portion and the other of the pair of bearing surfaces is defined on the outer surface of the base portion of the central portion of the cam plate.

In further versions, a variable compression ratio device is provided and is operable to vary the longitudinal position of the cam plate relative to the output shaft. The variable compression ratio device may be an actuator disposed between the housing and the cam plate.

In some embodiments, the engine housing further has a second pair of spaced apart bearing surfaces defined on the inner surface of the bore and the output shaft has a pair of spaced apart bearing surfaces defined on the outer surface. The output shaft is received in the bore of the housing such that the pair of spaced apart bearing surfaces on the output shaft are generally aligned with the second pair of spaced apart bearing surfaces in the bore of the housing. One of the bearing surfaces on the output shaft may be disposed between the cam plate and the first end of the engine housing and the other of the bearing surfaces on the output shaft may be disposed between the cam plate and the second end of the engine.

In certain versions, the engine housing comprises a main housing and at least one bearing support element, with the bearing support element defining one of the bearing surfaces.

In some versions, the engine housing further comprises a pair of bearing journal members each disposed on the inner surface of the bore, the bearing journal members defining the bearing surfaces on the output shaft. In other versions, the cam plate further comprises a pair of bearing journal members each disposed on the outer surface of the central portion, the bearing journal members defining the spaced apart bearing surfaces on the outer surface of the central portion.

In some embodiments, the engagement elements on the outer surface of the output shaft comprise a plurality of radial splines and the engagement elements on the inner surface of the bore in the cam plate comprise a plurality of radial splines.

In an alternative embodiment, the engagement elements on the outer surface of the output shaft comprise a plurality of ball races and the engagement elements on the inner surface of the bore in the cam plate comprise a plurality of ball races. The engine further includes a plurality of balls disposed between the ball races on the outer surface of the output shaft and the ball races on the inner surface of the bore in the cam plate, the balls mechanically coupling the cam plate to the output shaft such that the shaft and cam plate are coupled together for rotation about the longitudinal axis and the cam plate is longitudinally slidable with respect to the shaft.

In some embodiments, the engine further includes a flywheel having a plurality of lobes, each lobe being disposed generally in alignment with an area where the cam surface undulates closest to the open end of a cylinder. Each flywheel lobe may have a curved surface directed toward the cam surface of the cam plate. The cam portion has a curved surface directed away from the cylinders, and the curved surface of each flywheel lobe may be generally parallel to the curved surface of the cam portion. In some versions, the flywheel has a hub, the hub being directly connected to the central portion of the cam plate. Where the cam plate has two areas where the cam surface is disposed on the side of the cam plane closest to the open end of the cylinders, the flywheel may have two lobes. In certain versions, the lobes of the flywheel each have a longitudinally thickest portion which is longitudinally aligned with the area where the cam surface undulates closest to the open end of a cylinder. The flywheel has a radial outer edge defining the maximum radius of the flywheel. Each of the lobes may extend to the radial outer edge with a gap being defined between each lobe wherein a gap is defined at the radial outer edge. Alternatively, a connection portion may extend between each of the lobes, the connection portions each having a longitudinally thickness less than the longitudinal thickness of the lobes.

In a further embodiment of the present invention, an internal combustion barrel engine has an engine housing with a first end and an opposite second end. A longitudinal bore is defined in the housing. The bore in the engine housing has an inner surface with a first and a second pair of spaced apart bearing surfaces defined thereon. An elongated longitudinal output shaft is disposed in the longitudinal bore of the engine housing and defines a longitudinal axis of the engine, the output shaft having an outer surface with a pair of spaced apart bearing surfaces defined thereon. A plurality of cylinders is defined in the engine housing and disposed about the longitudinal output shaft. Each of the cylinders has a cylinder axis that is generally parallel to the longitudinal axis of the engine and has a closed end adjacent the first end of the housing and an opposite open end. A cam plate is received on the output shaft and disposed between the open ends of the cylinders and the second end of the engine housing. The cam plate has a central portion and a cam portion extending outwardly therefrom. The cam portion has a non-planar undulating cam surface. The central portion of the cam plate having an outer surface with a pair of spaced apart bearing surfaces defined thereon. The output shaft and the cam plate are disposed in the bore in the housing such that the pair of bearing surfaces on the outer surface of the central portion of the cam plate are generally aligned with the first pair of bearing surfaces on the inner surface of the bore in the housing and the pair of bearing surfaces on the outer surface of the shaft are generally aligned with the second pair of bearing surfaces on the inner surface of the bore in the housing.

In some versions, the output shaft further comprises a pair of bearing journal members each disposed on the outer surface, the bearing journal members defining the bearing surfaces on the output shaft. In further versions, the cam plate further comprises a pair of bearing journal members each disposed on the central portion, the bearing journal members defining the bearing surfaces on the central portion.

In some embodiments, the outer surface of output shaft further includes engagement elements defined thereon. The central portion of the cam plate has a bore defined longitudinally therethrough, and the bore has an inner surface with engagement elements defined thereon. The engagement elements on the inner surface of the cam plate bore are mechanically coupled to the engagement elements on the outer surface of the output shaft such that the shall and cam plate are coupled for rotation about the longitudinal axis and the cam plate is longitudinally slidable with respect to the shaft.

In some versions, the engagement elements on the outer surface of the output shaft are a plurality of radial splines and the engagement elements on the inner surface of the bore in the cam plate are a plurality of radial splines.

In an alternative version, the engagement elements on the outer surface of the output shaft are a plurality of ball races and the engagement elements on the inner surface of the bore in the cam plate are a plurality of ball races. The engine further includes a plurality of balls disposed between the ball races on the outer surface of the output shaft and the ball races on the inner surface of the bore in the cam plate, the balls mechanically coupling the cam plate to the output shaft such that the shaft and cam plate are coupled together for rotation about the longitudinal axis and the earn plate is longitudinally slidable with respect to the shaft.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

In an internal combustion barrel engine, it is necessary to support the output shaft and cam plate for rotation about the longitudinal axis of the output shaft. Typically, the cam plate and output shaft are formed as one piece and may be supported by bearings between the output shaft and the engine housing. In some embodiments of the present invention, bearing surfaces are provided on an outer surface of a central portion of the can plate and corresponding bearing surfaces are provided in the engine housing. This allows the cam plate to be directly supported by the engine housing such that the output shaft does not have to bear the significant side loads on the cam plate. Instead, these loads are counteracted by the engine housing or block.

In some embodiments of the present invention, the cam plate and the power shaft are separate elements that are mechanically coupled such that they rotate together. In further embodiments, the cam plate is mechanically coupled to the power shaft such that the cam plate is longitudinally slidable relative to the output shaft and the engine housing. By varying the longitudinal position of the cam plate relative to the engine housing, the compression ratio of the engine may be varied. A variable compression ratio device may be provided for adjusting the longitudinal position of the cam plate relative to the engine housing. The combination of a sliding joint between the cam plate and output shaft with a variable compression ratio device allows the compression ratio to be adjusted without changing the longitudinal position of the output shaft. An embodiment of the present invention is described below which includes each of these features. It should be understood that the present invention is not limited to this embodiment.

Figure 1:
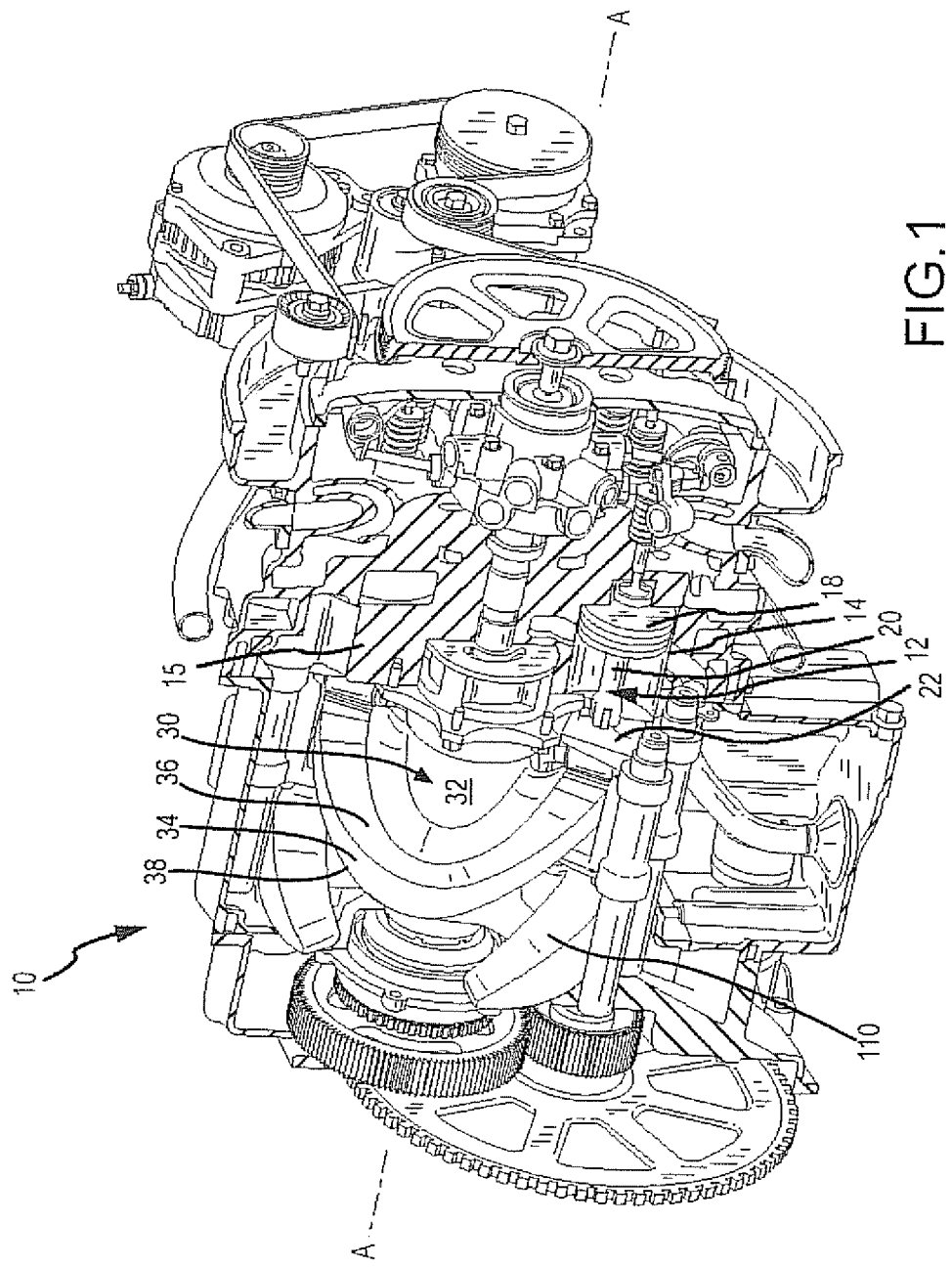
FIG. 1 is a perspective view of an embodiment of a internal combustion barrel engine with portions cut away so as to show internal components.
Figure 2:
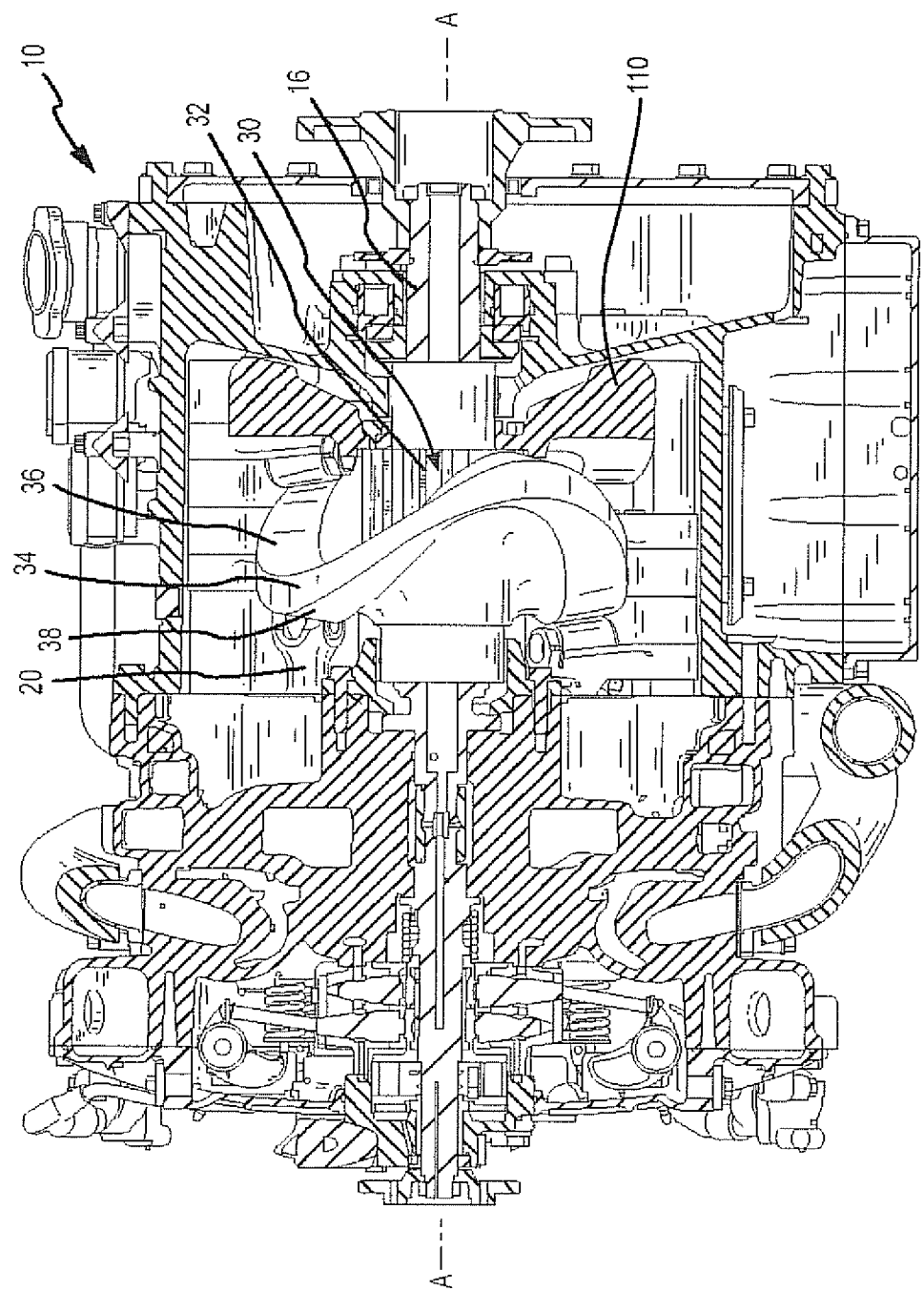
FIG. 2 is a cross sectional side view of the barrel engine of FIG. 1.

FIG. 1 is a perspective view and FIG. 2 is a side view of an internal combustion barrel engine 10 according to an embodiment of the present invention with portions cut away to show the internal components. The engine 10 includes a plurality of piston assemblies 12 and cylinders 14 each having axes that are generally parallel with a power output shaft 16. The cylinders are provided by an engine housing or block 15. The engine housing 15 may be said to have a longitudinal bore for receiving the power output shaft. The power output shaft 16 may be said to define a longitudinally extending axis of rotation A. The pistons 12 and cylinders 14 are arranged in a circular formation concentric with the power output shaft 16.

Each piston assembly 12 includes a piston 18 disposed in a cylinder 14 and a rod 20 extending longitudinally from the piston 12.

In the illustrated embodiment, the piston assembly 12 includes a cross head bearing assembly 22 which is pivotally interconnected to the distal end of the rod 20. In alternative embodiments, the interconnection between the piston assembly and the cam plate may be provided in other ways, including single or double roller elements or sliding mechanisms. Further, the piston rod 20 may be rigidly interconnected with the bearing or sliding mechanism and/or the piston rod and bearing housing may be integrated into a single component.

In the illustrated embodiment, a cam plate 30 is received on the power shaft 16. The cam plate 30 includes a central portion 32 adjacent the power shaft 16 and a cam portion 34 that extends radially outwardly therefrom. In this embodiment, the cam portion 34 has a pair of opposed cam surfaces 36 and 38 which both may be said to be non-planar undulating cam surfaces. The bearing assembly 22 has a pair of rollers which engage the surfaces 36 and 38. As such, as combustion forces reciprocate the piston assemblies 12, the cam plate 30 rotates about the longitudinal axis A of the engine. As will be clear to those of skill in the art, the undulating cam portion 34 leaves some space in the areas where the cam portion undulates closest to the open ends of the cylinders. As shown, a flywheel 110 may be partially packaged in these areas. This allows the overall engine length to be similar with or without the flywheel 110, since the flywheel is mainly packaged in otherwise wasted space.

Figure 3:
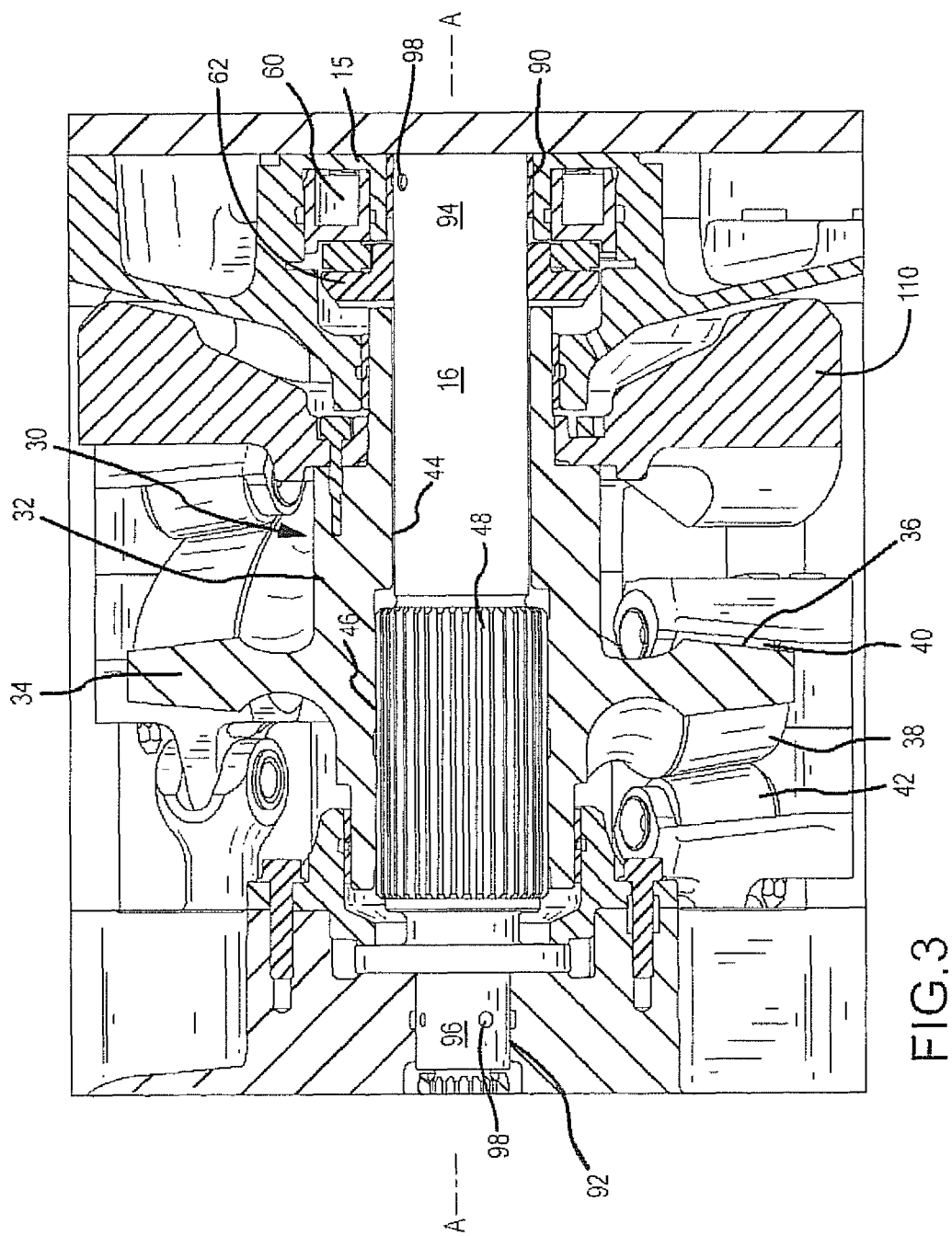
FIG. 3 is a detailed cross sectional side view of a portion of the barrel engine showing the cam plate and output shaft, along with an optional variable compression ratio device.
Figure 7:
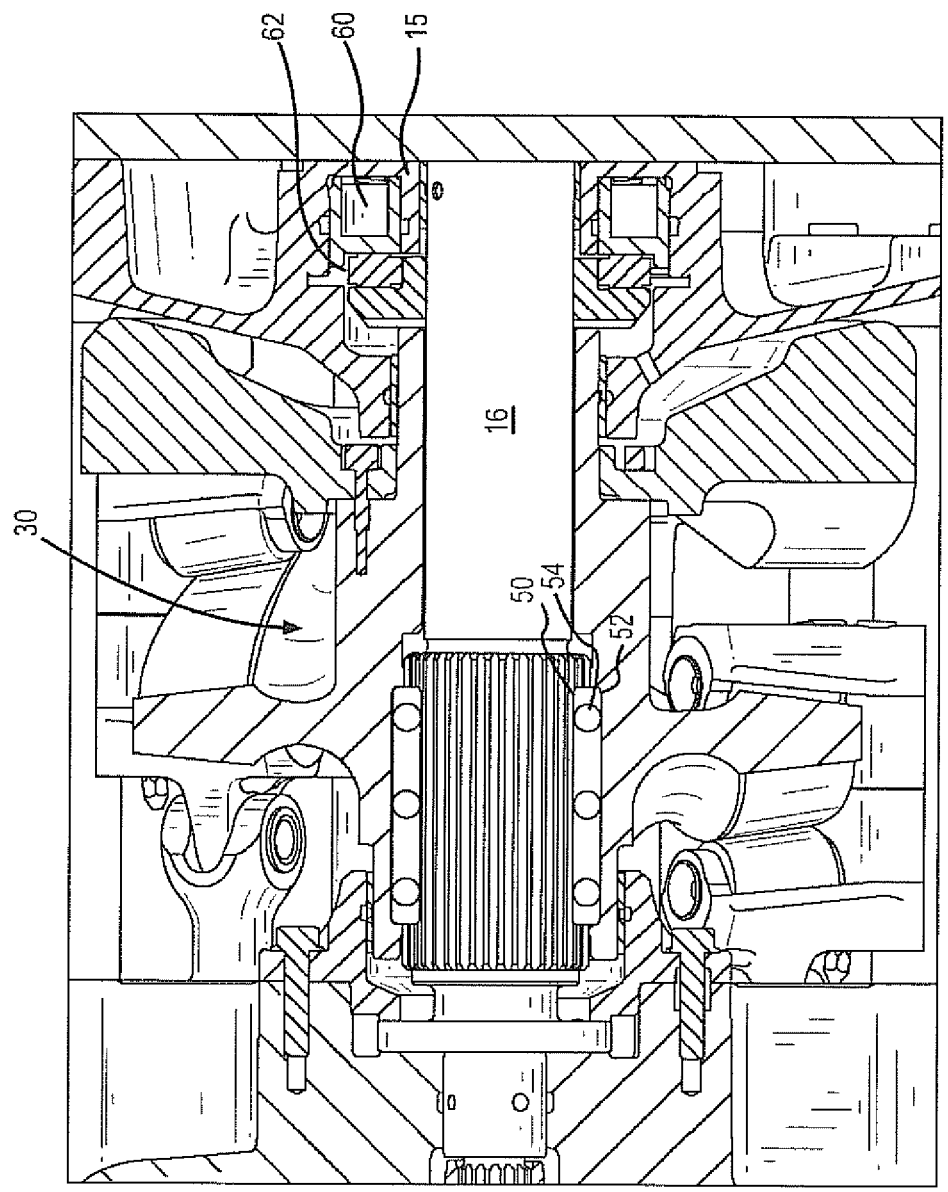
FIG. 7 is a cross-sectional view of a portion of the cam plate assembled in an embodiment of the engine.

Referring now to FIG. 3, a detailed cross sectional side view of a portion of the barrel engine is provided, showing the cam plate 30 partially cut away. This figure illustrates a pair of rollers 40 and 42 engaging the cam surfaces 36 and 38 respectively. As shown, the power output shaft 16 is an elongated shaft that extends through a bore 44 defined longitudinally through the central portion 32 of the cam plate 30. Preferably, the cam plate 30 is mechanically coupled to the output shaft 16 such that they rotate together about the longitudinal axis A. The bore 44 in the central portion 32 of the cam plate 30 may be said to have an inner surface with engagement elements defined thereon. In the embodiment illustrated in FIG. 3, the engagement elements are radial splines 46 that extend inwardly from the inner surface of the bore 44. The output shaft 16 has corresponding engagement elements defined on an outer surface of the output shaft 16. In the embodiment illustrated in FIG. 3, the engagement elements are radial splines 48 that extend outwardly from the outer surface of the shaft 16 and engage the splines 46 of the cam plate 30. As will be clear to those of skill in the art, the mechanical coupling between the cam plate 30 and the shaft 16 may take other forms. One example is shown in FIG. 7. In this embodiment, the engagement elements on the outer surface of the output shaft take the form of ball races 50. In this embodiment, the cam plate has corresponding ball races 52 defined in the inner surface of the bore. Balls 54 are provided in these ball races to mechanically couple the cam plate to the shaft. While FIG. 7 also shows radial spines, these may or may not be included in embodiments including the ball races and balls. Also, additional ball races may be provided between on the output shaft and in the bore, along with additional balls to couple the output shaft to the cam plate. The ball races are illustrated as being straight in a longitudinal direction. Alternatively, they may be angled or wrap around the output shaft such that longitudinal movement of the cam plate relative to the output shaft is accompanies by some amount of relative rotational movement.

In the embodiment shown in FIG. 3 and the embodiment shown in FIG. 7, it is preferred that the mechanical coupling between the cam plate and shaft couple the cam plate and shaft together for rotation about the axis A, but allow the cam plate to be moved or slid longitudinally relative to the shaft. As such, the mechanical coupling between the cam plate and shaft substantially prevents relative rotational motion between the plate and shaft but allows relative longitudinal movement.

As discussed previously, preferred embodiments of the present invention may utilize a variable compression ratio device to adjust the longitudinal position of the cam plate 30 relative to the shaft 16 and housing 15. The mechanical coupling just discussed allows the longitudinal position on the cam plate 30 to be adjusted without changing the longitudinal position of the shaft 16. FIGS. 3 and 7 illustrate an actuator 60 disposed between one end of the cam plate 30 and the engine housing 15. The actuator 60 is operable to apply longitudinal force to one end of the cam plate 30, via an intermediary element 62, thereby changing the longitudinal position of the cam plate 30. As will be clear to those of skill in the art, the variable compression ratio device may take a variety of forms other than the actuator 60 shown. Though not shown, the engine may further include a biasing element for biasing the cam plate 30 such that it remains in contact with the variable compression ratio device.

As will be clear to those of skill in the art, the forces transmitted between the piston assemblies and the cam plate 30 may be substantial. These forces act in a direction that would cause the cam plate 30 to rock with respect to the shaft 16 if the cam plate 30 were not supported. For operation of a variable compression ratio device, it is preferred that these rocking forces not be transmitted from the cam plate 30 to the shaft 16. If these forces are transmitted from the plate to the shaft, these forces will make it more difficult to longitudinally move the cam plate 30. For example, such forces may lead to binding in the mechanical coupling between the plate and shaft.

Figure 4:
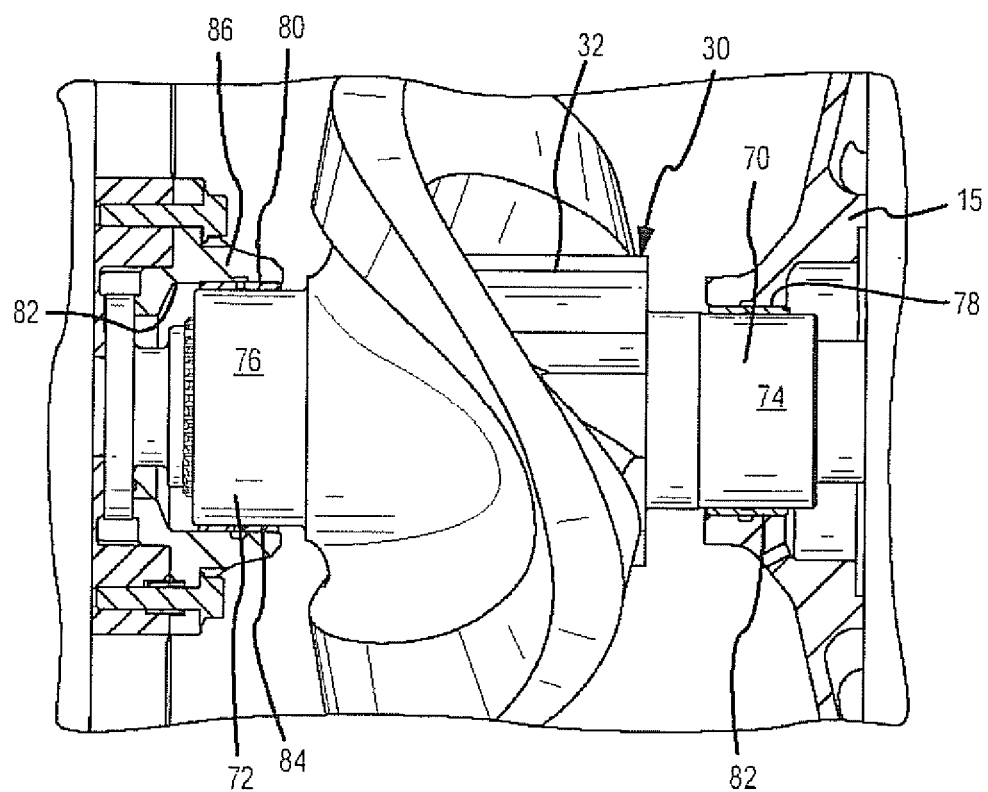
FIG. 4 is an enlarged side view of a portion of the cam plate and power output shaft with much of the engine housing cut away.

In some embodiments, the cam plate 30 is directly supported by the engine housing to counteract these rocking forces. Referring now to FIG. 4, an enlarged side view is provided of the cam plate 30 with much of the remainder of the engine removed for clarity. In this embodiment, the central portion 32 of the cam plate 30 has a base portion 70 that extends towards one end of the engine and an opposite top portion 72 that extends towards the other end of the engine. A pair of spaced apart bearing surfaces 74 and 76 are provided on the outer surfaces of the base portion 70 and top portion 72, respectively. The engine housing 15 has a corresponding pair of spaced apart bearing surfaces 78 and 80 in what may be called a longitudinal bore 82 that extends through the engine housing. When the output shaft 16 and cam plate 30 are disposed in the longitudinal bore of the engine housing 15, the bearing surfaces 74 and 76 on the outer surface of the central portion 32 of the cam plate 30 are generally aligned with the bearing surfaces 78 and 80 on the inner surface of the bore 82 in the engine housing 15. As shown, bearing journal members 82 and 84 may be provided on the outer surface of the central portion 32 of the cam plate and/or the inner surface of the bore 82 of the housing 15 such that the bearing journal members define the bearing surfaces. In the illustrated embodiment, the bearings take the form of traditional engine journal bearings. Alternatively, the bearings may take the form of ball or roller bearings. However, it is preferred that the bearings defined between the cam plate 30 and engine housing 15 allow longitudinal movement of the cam plate 30 relative to the housing 15. The bearings are typically fed with pressurized oil.

The engine housing 15 is typically formed as multiple pieces and the bearing surfaces may be formed by elements that are interconnected with the remainder of the housing. For example, a bearing support element is shown at 86. This bearing support element may be considered as part of the engine housing for purposes of the present invention.

Figure 5:
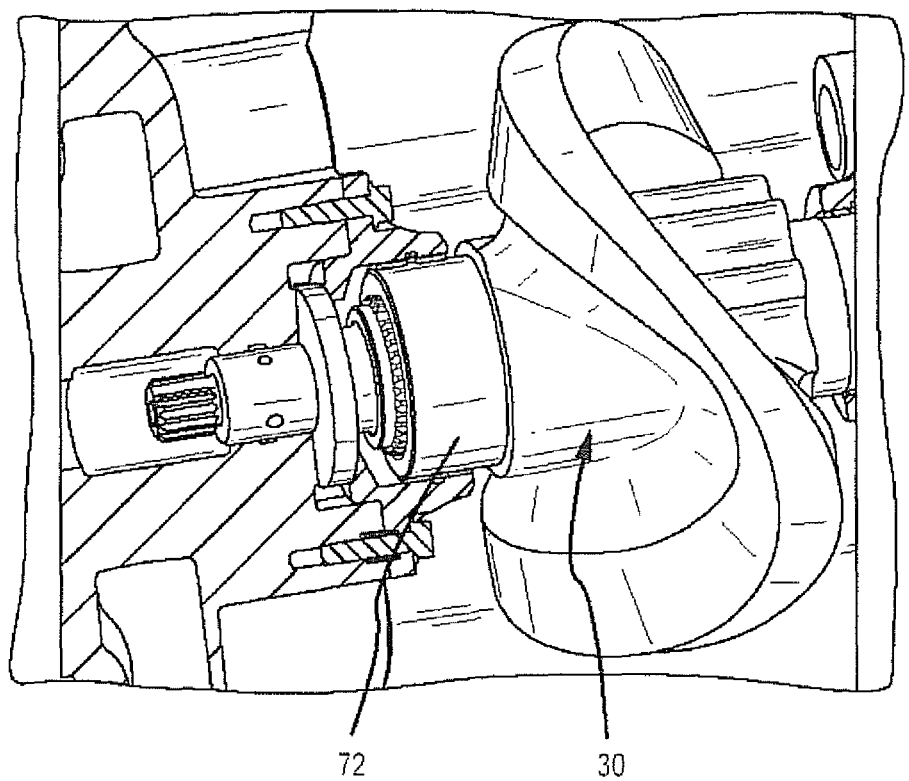
FIG. 5 is an enlarged perspective view of one end of the cam plate and output shaft.
Figure 6:
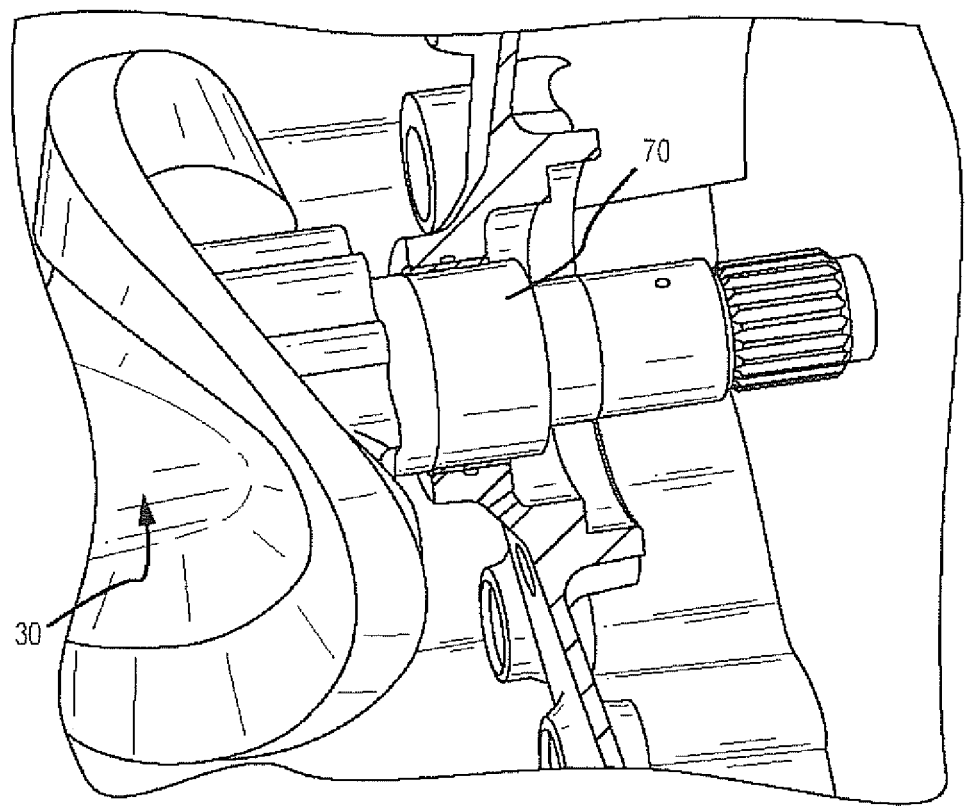
FIG. 6 is an enlarged perspective view of the other end of the cam plate and output shaft.

FIG. 5 provides an enlarged perspective view of the top portion 72 of the cam plate 30, while FIG. 6 provides an enlarged perspective view of the base portion 70 of the cam plate 30. Certain portions of the engine, such as the flywheel, are left out of FIGS. 4-6 to simplify the drawing.

Referring again to FIG. 3, it is preferred that the elongated power output shaft 16 be supported by an additional pair of spaced apart bearings. The engine housing 15 may be said to have a second pair of spaced apart bearing surfaces 90 and 92 defined on the inner surface of the bore of the housing 15. The shaft 16 has a pair of corresponding spaced apart bearing surfaces 94 and 96 defined on the outer surface of the shaft 16. The bearing surfaces 90 and 94 and the bearing surfaces 92 and 96 are generally aligned so as to rotationally support the shaft 16. Once again, bearing journal members may be provided so as to define one or both of the bearing surfaces, or ball or roller bearings may be provided. Preferably, the bearings are provided with pressurized oil, such as by the oil holes 98 shown in shaft 16. Alternatively, the pressurized oil may be provided to the bearings from the housing 15 with pressurized oil being fed through one or more of the holes in the shaft and from there being provided to the mechanical coupling, such as the splines 46 and 48.

Figure 8:
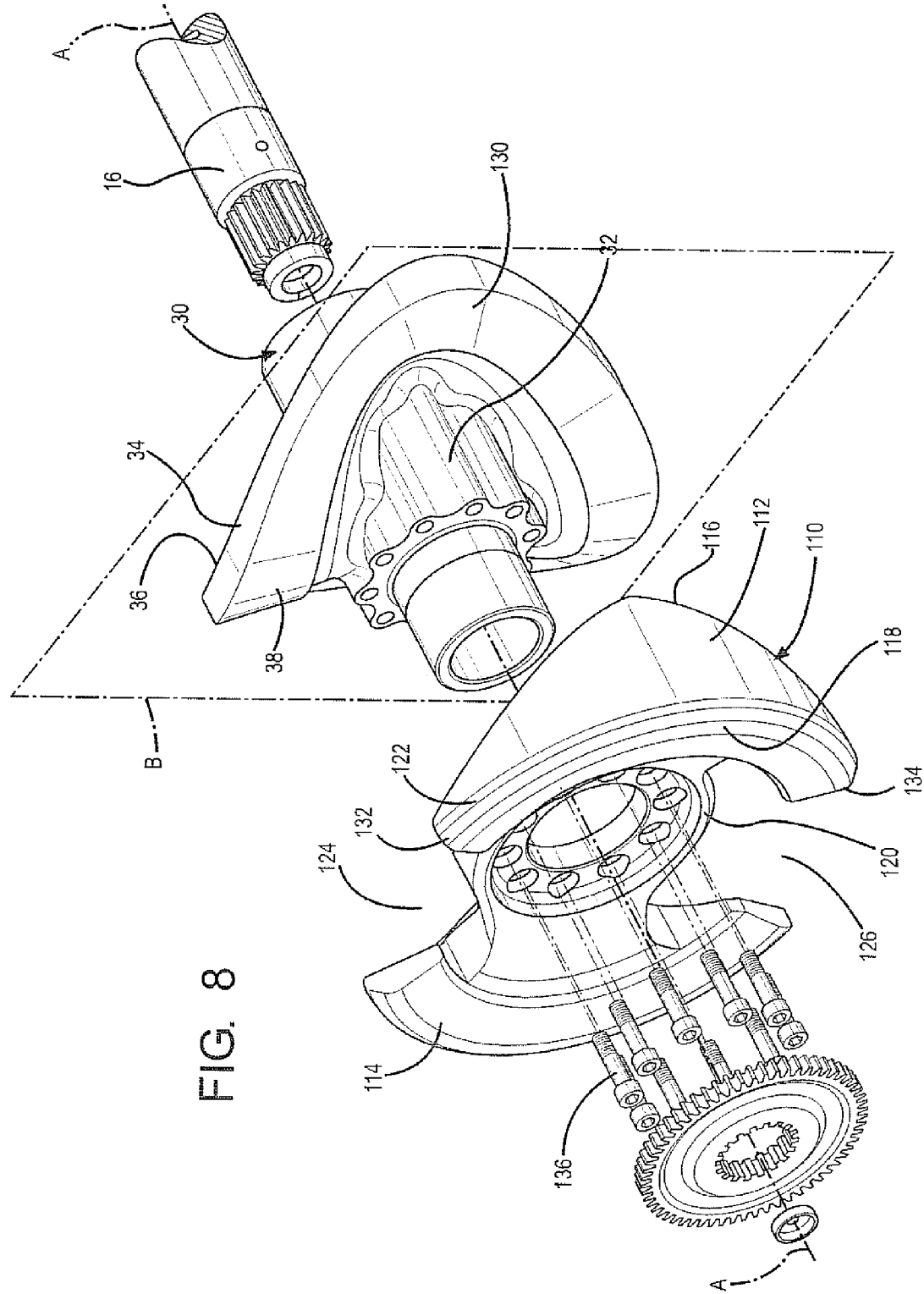
FIG. 8 is an exploded view of portions of an embodiment of the engine, showing the flywheel, cam plate and output shaft.

Referring now to FIG. 8, the flywheel 110 is shown in more detail. FIG. 8 provides an exploded view of the power shaft 16, the cam plate 30 and the flywheel 110. As will be clear to those of skill in the art, the cam plate undulates closer to and then farther from the open ends of the cylinders. It may be said to undulated back and forth across a cam plane B that is defined perpendicular to the longitudinal axis A. The plane B may be positioned such that half of the cam portion 34 is on one side and half is on the other. Where the cam plate undulates closer to the open ends of the cylinders, there is space left unutilized. The flywheel 110 has lobes 112 and 114 that fill this space.

In the illustrated embodiment, the flywheel lobes have a first surface 116 that is directed toward the cam surface 38 and an opposite second surface 118 that is directed away from the cam surface 38. In the illustrated embodiment, the first surface generally follows a curve parallel to the cam surface 38 and the opposite second surface 118 is generally parallel to the cam plane B.

The flywheel 110 also has a central hub 120. The lobes 112 and 114 are connected to the hub and extend radially outwardly therefrom. The flywheel has a radial outer edge 122 defining the maximum radius of the flywheel. Each of the lobes extends to this radial outer edge 122. Gaps 124 and 126 are defined between the lobes 112 and 114. As shown, the gaps are cutouts where the flywheel 110 does not have any material extending outwardly as far as the outer edge 122.

The flywheel lobes 112 and 114 may also be described as each being disposed generally in alignment with an area where the cam surface undulates closest to the open ends of the cylinders, which is also furthest from the flywheel overall. One such area of the cam surface 38 is indicated at 130 in FIG. 8. As shown, the portion of the flywheel lobe 112 that is thickest in the longitudinal direction (parallel to axis A) is longitudinally aligned with the area 130 and the flywheel tapers to be thinner towards its opposed ends 132 and 134.

As best shown in FIG. 8, the illustrated embodiment of the flywheel 110 is attached directly to the central portion 32 of the can plate 30 using a plurality of fasteners 136. This is a preferred arrangement, since the rotational inertial loads are passed directly between the cam plate and the flywheel rather than passing through the power shaft. This is especially preferred in embodiments wherein the cam plate 30 is longitudinally movable with respect to the power shaft 16, as discussed earlier. As will be clear to those of skill in the art, the flywheel may be connected with the cam plate and/or power shaft in ways other than illustrated.

Other shapes are also possible for the flywheel. The flywheel may be a complete plate or ring with thicker areas where space allows. As will be clear to those of skill in the art, this configuration will take slightly more room in the engine, but may be beneficial for some applications. The lobes may also have other shapes. For example, the lobes may be each rectangular shaped when viewed from the side, if such a shape provides sufficient rotational mass.

The illustrated embodiment is for a barrel engine design in which the cam plate undulates towards the open ends of the cylinders in two areas, and therefore the flywheel has two lobes. As will be clear to those of skill in the art, the cam plate may have three or more areas where it undulates closest to the open ends of the cylinders, and a flywheel according to the present invention will preferably include a matching number of lobes.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. An internal combustion barrel engine, comprising:
an engine housing having a first end and an opposite second end, a longitudinal bore defined in the housing, the bore in the engine housing having an inner surface with a pair of spaced apart bearing surfaces defined thereon;
an elongated longitudinal output shaft disposed in the longitudinal bore of the engine housing and defining a longitudinal axis of the engine, the output shaft having an outer surface with engagement elements defined thereon;
a plurality of cylinders defined in the engine housing and disposed about the longitudinal output shaft, each of the cylinders having a cylinder axis that is generally parallel to the longitudinal axis of the engine, each of the cylinders having a closed end adjacent the first end of the housing and an opposite open end;

a cam plate disposed between the open ends of the cylinders and the second end of the engine housing, the cam plate having a central portion and a cam portion extending outwardly therefrom, the cam portion having a non-planar undulating cam surface, the central portion of the earn plate having an outer surface with a pair of spaced apart bearing surfaces defined thereon, the central portion of the cam plate further having a bore defined longitudinally therethrough, the bore having an inner surface with engagement elements defined thereon;

the cam plate being received on the output shaft with the output shaft extending through the bore in the cam plate, the engagement elements on the inner surface of the cam plate bore being mechanically coupled to the engagement elements on the outer surface of the output shaft such that the shaft and cam plate are coupled for rotation about the longitudinal axis and the cam plate is longitudinally slidable with respect to the shaft;

wherein the earn plate is disposed in the bore in the housing such that the bearing surfaces on the outer surface of the central portion of the cam plate are generally aligned with the bearing surfaces on the inner surface of the bore in the housing.

2. An internal combustion barrel engine in accordance with claim 1, wherein the central portion of the cam plate has a base portion extending toward the second end of the engine housing and an opposite top portion extending toward the first end of the engine, one of the pair of bearing surfaces being defined on the outer surface of the top portion and the other of the pair of bearing surfaces being defined on the outer surface of the base portion of the central portion of the cam plate.

3. An internal combustion barrel engine in accordance with claim 1, further comprising:
a variable compression ratio device operable to vary the longitudinal position of the cam plate relative to the output shaft.

4. An internal combustion barrel engine in accordance with claim 3, wherein the variable compression ratio device comprises an actuator disposed between the housing and the cam plate.

5. An internal combustion barrel engine in accordance with claim 1, wherein:
the engine housing further has a second pair of spaced apart bearing surfaces defined on the inner surface of the bore; and
the output shaft has a pair of spaced apart bearing surfaces defined on the outer surface;
wherein the output shaft is received in the bore of the housing such that the pair of spaced apart bearing surfaces on the output shaft are generally aligned with the second pair of spaced apart bearing surfaces in the bore of the housing.

6. An internal combustion barrel engine in accordance with claim 5, wherein one of the bearing surfaces on the output shaft is disposed between the cam plate and the first end of the engine housing and the other of the bearing surfaces on the output shaft is disposed between the cam plate and the second end of the engine.

7. An internal combustion barrel engine in accordance with claim 1, wherein the engine housing comprises a main housing and at least one bearing support element, the bearing support element defining one of the bearing surfaces.

8. An internal combustion barrel engine in accordance with claim 1, wherein the engine housing further comprises a pair of bearing journal members each disposed on the inner surface of the bore, the bearing journal members defining the bearing surfaces on the output shaft.

9. An internal combustion barrel engine in accordance with claim 1, wherein the cam plate further comprises a pair of bearing journal members each disposed on the outer surface of the central portion, the bearing journal members defining the spaced apart bearing surfaces on the outer surface of the central portion.

10. An internal combustion barrel engine in accordance with claim 1, wherein:
the engagement elements on the outer surface of the output shaft comprise a plurality of radial splines; and
the engagement elements on the inner surface of the bore in the cam plate comprise a plurality of radial splines.

11. An internal combustion barrel engine in accordance with claim 1, wherein:
the engagement elements on the outer surface of the output shaft comprise a plurality of ball races;
the engagement elements on the inner surface of the bore in the cam plate comprise a plurality of ball races; and
the engine further comprising a plurality of balls disposed between the ball races on the outer surface of the output shaft and the ball races on the inner surface of the bore in the cam plate, the balls mechanically coupling the cam plate to the output shaft such that the shaft and cam plate are coupled together for rotation about the longitudinal axis and the cam plate is longitudinally slidable with respect to the shaft.

12. An internal combustion barrel engine in accordance with claim 1, further comprising:
a flywheel having a plurality of lobes, each lobe being disposed generally in alignment with an area where the cam surface undulates closest to the open end of a cylinder.

13. An internal combustion barrel engine in accordance with claim 12, wherein:
each flywheel lobe has a curved surface directed toward the cam surface of the cam plate; and
the cam portion has a curved surface directed away from the cylinders, the curved surface of each flywheel lobe being generally parallel to the curved surface of the cam portion.

14. An internal combustion barrel engine in accordance with claim 12, wherein:
the flywheel has a hub, the hub being directly connected to the central portion of the cam plate.

15. An internal combustion barrel engine, comprising:
an engine housing having a first end and an opposite second end, a longitudinal bore defined in the housing, the bore in the engine housing having an inner surface with a first and a second pair of spaced apart bearing surfaces defined thereon;
an elongated longitudinal output shaft disposed in the longitudinal bore of the engine housing and defining a longitudinal axis of the engine, the output shaft having an outer surface with a pair of spaced apart bearing surfaces defined thereon;
a plurality of cylinders defined in the engine housing and disposed about the longitudinal output shaft, each of the cylinders having a cylinder axis that is generally parallel to the longitudinal axis of the engine, each of the cylinders having a closed end adjacent the first end of the housing and an opposite open end;

a cam plate received on the output shaft and disposed between the open ends of the cylinders and the second end of the engine housing, the cam plate having a central portion and a cam portion extending outwardly therefrom, the cam portion having a non-planar undulating cam surface, the central portion of the cam plate having an outer surface with a pair of spaced apart bearing surfaces defined thereon;

wherein the output shaft and the cam plate are disposed in the bore in the housing such that the pair of bearing surfaces on the outer surface of the central portion of the cam plate are generally aligned with the first pair of bearing surfaces on the inner surface of the bore in the housing and the pair of bearing surfaces on the outer surface of the shaft are generally aligned with the second pair of bearing surfaces on the inner surface of the bore in the housing.

16. The internal combustion barrel engine as set forth in claim 15, wherein the output shaft further comprises a pair of bearing journal members each disposed on the outer surface, the bearing journal members defining the bearing surfaces on the output shaft.

17. The internal combustion barrel engine as set forth in claim 15, wherein the cam plate further comprises a pair of bearing journal members on the central portion, the bearing journal members defining the bearing surfaces on the central portion.

18. An internal combustion barrel engine in accordance with claim 12, wherein:
the outer surface of output shaft further includes engagement elements defined thereon;
the central portion of the cam plate has a bore defined longitudinally therethrough, the bore having an inner surface with engagement elements defined thereon; and
the engagement elements on the inner surface of the cam plate bore being mechanically coupled to the engagement elements on the outer surface of the output shaft such that the shaft and cam plate are coupled for rotation about the longitudinal axis and the cam plate is longitudinally slidable with respect to the shaft.

19. An internal combustion barrel engine in accordance with claim 18, wherein:
the engagement elements on the outer surface of the output shaft comprise a plurality of radial splines; and
the engagement elements on the inner surface of the bore in the cam plate comprise a plurality of radial splines.

20. An internal combustion barrel engine in accordance with claim 18, wherein:
the engagement elements on the outer surface of the output shaft comprise a plurality of ball races;
the engagement elements on the inner surface of the bore in the cam plate comprise a plurality of ball races; and
the engine further comprising a plurality of balls disposed between the ball races on the outer surface of the output shaft and the ball races on the inner surface of the bore in the cam plate, the balls mechanically coupling the cam plate to the output shaft such that the shaft and cam plate are coupled together for rotation about the longitudinal axis and the cam plate is longitudinally slidable with respect to the shaft.

* * * * *